United States Patent
Kanouda et al.

(10) Patent No.: US 7,692,400 B2
(45) Date of Patent: Apr. 6, 2010

(54) MOBILE TYPE POWER SUPPLY, CONNECTION DEVICE, AND CARRIED TYPE ELECTRONIC EQUIPMENT

(75) Inventors: Akihiko Kanouda, Hitachinaka (JP); Yasuaki Norimatsu, Hitachi (JP); Fumio Murabayashi, Naka (JP)

(73) Assignee: Hitachi, Ltd., Tokyo (JP)

( * ) Notice: Subject to any disclaimer, the term of this patent is extended or adjusted under 35 U.S.C. 154(b) by 120 days.

(21) Appl. No.: 11/849,261

(22) Filed: Aug. 31, 2007

(65) Prior Publication Data
US 2008/0258678 A1    Oct. 23, 2008

Related U.S. Application Data

(63) Continuation of application No. 10/804,122, filed on Mar. 19, 2004, now abandoned.

(30) Foreign Application Priority Data

Apr. 18, 2003 (JP) ............................. 2003-114299

(51) Int. Cl.
*H01M 10/44* (2006.01)
*H01M 6/28* (2006.01)
*H02J 7/00* (2006.01)

(52) U.S. Cl. .................. 320/101; 320/103; 320/104; 320/112; 320/132; 320/139; 429/125

(58) Field of Classification Search ............... 320/101, 320/104, 103, 112, 132, 139; 429/125
See application file for complete search history.

(56) References Cited

U.S. PATENT DOCUMENTS

| 6,326,771 | B1 | 12/2001 | Popescu-Stanesti |
| 6,559,621 | B2 * | 5/2003 | Corless et al. ............... 320/103 |
| 2003/0122523 | A1 | 7/2003 | Kim et al. |
| 2004/0170875 | A1 * | 9/2004 | Ozeki et al. .................. 429/22 |

FOREIGN PATENT DOCUMENTS

| JP | 07-249399 | 9/1995 |
| JP | 09-199096 | 7/1997 |
| JP | 10-064567 | 3/1998 |
| JP | 2002-032154 | 1/2002 |
| JP | 2002-169625 | 6/2002 |
| JP | 2002-280044 | 9/2002 |
| JP | 2002-289211 | 10/2002 |
| JP | 2002-334712 | 11/2002 |
| JP | 2003-051333 | 2/2003 |

* cited by examiner

*Primary Examiner*—Edward Tso
*Assistant Examiner*—Yalkew Fantu
(74) *Attorney, Agent, or Firm*—Antonelli, Terry, Stout & Kraus, LLP.

(57) ABSTRACT

A battery and a DC-to-DC converter are contained in a battery pack. When the battery pack is connected to a load by means of a connector and an output voltage reference value, corresponding to the power supply voltage of the load, the output voltage of the battery is converted according to the output voltage reference value by the DC-to-DC converter. The output voltage reference value is set by an output voltage reference value output means in the connector. Furthermore, the converted voltage is supplied to the load via an output voltage line.

8 Claims, 13 Drawing Sheets

FIG. 7

| CONDITION OF ELECTRIC DOUBLE-LAYER CAPACITOR 33 | | CONDITION OF SWITCH 12 | | |
|---|---|---|---|---|
| | | ON | OFF | CABLE DISCONNECTED |
| | A / B | L | H | H |
| VOLTAGE DROP | L | OPEN | OPEN | OPEN |
| VOLTAGE NORMAL | H | OPEN | CLOSE | CLOSE |
| | | CONDITION OF VALVE 3 | | |

| CONDITION OF SWITCH 12 | ON | | OFF | |
|---|---|---|---|---|
| CONDITION OF CONNECTOR 46 | NORMAL | DISCONNECTED | NORMAL | DISCONNECTED |
| CONDITION OF SWITCH 48 | ON | ON | ON | ON |
| CONDITION OF VALVE 3 | OPEN | CLOSE | CLOSE | CLOSE |

MOBILE TYPE POWER SUPPLY, CONNECTION DEVICE, AND CARRIED TYPE ELECTRONIC EQUIPMENT

CROSS REFERENCE TO RELATED APPLICATION

This application is a Continuation application of application Ser. No. 10/804,122, filed Mar. 19, 2004, now abandoned which claims priority from Japanese patent application JP 2003-114299, filed Apr. 18, 2003, the contents of which are incorporated herein by reference in their entirety.

BACKGROUND OF THE INVENTION

1. Field of the Invention

The present invention relates to a mobile type power supply, particularly to a mobile type power supply suitable for supplying the electric energy generated by a fuel cell, of the type which oxidizes methanol directly, to a load.

2. Prior Art

There have been offered various types of power supply system using fuel cell, which comprises a fuel tank for storing fuel and a power generation part for generating DC power from the fuel and supplies the power, generated in the power generation part, to a load. For example, there has been disclosed a system which comprises a fuel pack that can be attached/detached freely, a power generation module that generates specific electric energy by means of electrochemical reaction or fuel reaction, a code reader part that reads an attestation code assigned to the fuel pack, an attestation judgment part that attests and judges, based on the obtained attestation code, whether the fuel pack attached to the system is adequate or not, and an output control part that controls the generation of electric energy at the power generation part according to the result of the judgment. (See Cited Patent Document 1)

(Cited Patent Document 1)

Japanese Application Patent Laid-open Publication No. 2002-280044 (pages 5-11, FIG. 1)

SUMMARY OF THE INVENTION

Problems to be Solved by the Invention

In a prior art, there is provided an interface between the fuel and the power generation part as explained above but the interface with the load is not taken into account. The power supply voltage of mobile type information equipments, including notebook type personal computers, which are expected to be very much promising as a load to the power supply system using fuel cell, generally differs from one computer manufacturer to another and, even within the same manufacture, the voltage differs by model of the computer. Besides, even if the same voltage applies, there are quite a few different types of DC plug for supplying the power.

For the above reason, even if a fuel cell very much suitable for mobile application is developed, it must be offered in various types with different terminal specification and/or different output voltage specification for those various loads. In addition, if the fuel cell is designed for every different load, the design, development and manufacturing cost increases, resulting in a very costly power supply system.

An object of the present invention is to supply such voltage to a load that corresponds to the load.

Means for Solving the Problems

In order to realize the above object, according to the present invention, there is provided a mobile type power supply which comprises a battery pack containing a battery and an output voltage conversion means that converts the output voltage of the battery according to an output voltage reference value, and a connection means that is connected to both battery pack and a load and supplies DC power, outputted by the output voltage conversion means, to the load; of which connection means comprises an output voltage reference value output means that outputs an output voltage reference value, corresponding to the power supply voltage of the load, to the output voltage conversion means. It is permissible that the above is provided with an output voltage reference value output means that outputs an output voltage reference values, which, among multiple output voltage reference values, corresponds to the power supply voltage of the load, to the output voltage conversion means. It is also permissible to provide, instead of the battery pack, an AC adaptor containing an AC-to-DC converter that converts AC power from an AC power supply to DC power according to an output voltage reference value. In the above case, the connection means comprises an output voltage reference value output means that outputs an output voltage reference value, corresponding to the power supply voltage of the load, to the AC-to-DC converter.

With the afore-mentioned means, voltage corresponding to the load can be supplied to the load simply by outputting an output voltage reference value, corresponding to the power supply voltage of the load, to the output voltage conversion means as soon as the battery pack is connected to the connection means, and hence the battery pack cost can be reduced as a result of common utilization.

BRIEF DESCRIPTION OF THE DRAWINGS

FIG. 7 is a logical diagram for explaining the relationship between the start-stop circuit and valve of a mobile type power supply according to the fifth embodiment of the invention.

DETAILED DESCRIPTION OF THE INVENTION

Figure 1:
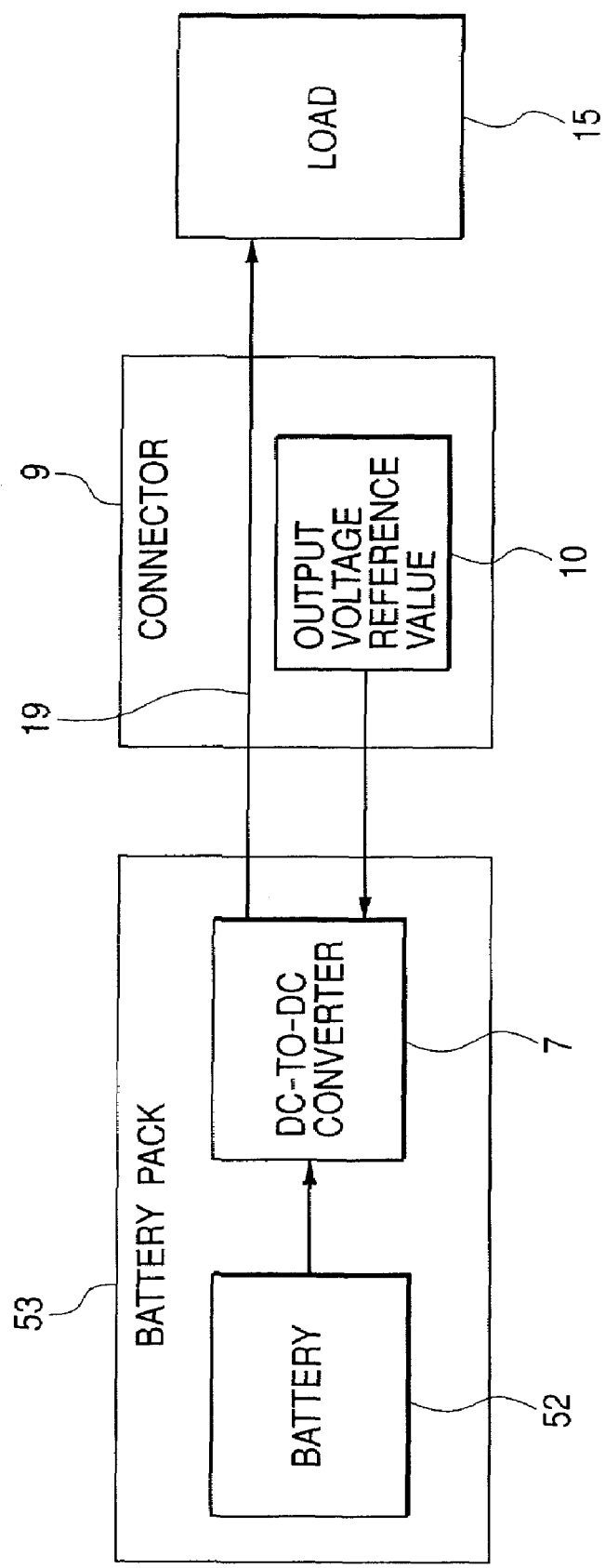
FIG. 1 is a block diagram of a mobile type power supply according to the first embodiment of the invention.

Embodiments of the present invention are described hereunder, using drawing figures. FIG. 1 is a block diagram of the mobile type power supply according to the first embodiment of the invention. In FIG. 1, the mobile type power supply comprises a battery pack 53 and a connector 9, and the connector 9 is made connectable to both the battery pack 53 and a load 15. The battery pack 53, containing a battery 52 and a DC-to-DC converter 7, is connected to a connector 9. The connector 9 contains an output voltage reference value output means 10, which outputs an output reference value, and an output voltage line 19 as well. The output voltage line 19 is connected to the DC-to-DC converter and to the load 15. The DC-to-DC converter is provided as an output voltage conversion means that converts the output voltage of the battery 52 according to the output voltage reference value. That is, when an output voltage reference value is inputted from the output voltage reference value output means 10, the DC-to-DC converter 7 converts the output voltage of the battery 52 to a voltage corresponding to the power supply voltage of the load 15 and supplies it to the load 15.

Next, the operation of the embodiment is described hereunder. The load 15 is a general mobile type equipment, and a connector 9 is needed as a connection means suitable for the load 15. As one end of the connector 9 is connected to the battery pack 53 and the other end to the load 15, the output voltage reference value output means 10 is connected to the DC-to-DC converter 7 and the output voltage of the DC-to-DC converter 7 is determined by the output voltage reference value. Because of this, the output voltage of the battery 52 can be stably supplied to the load 15.

This embodiment produces a merit that a new energy source can be provided without any modification to the load 15. Because of this merit, any load already existing in the market, office and home can apply. Further, by providing multiple connectors 9 suitable for different loads 15, only a single battery pack 53 becomes applicable to multiple loads. Since the required lineup of the battery pack 53 can be as small as the variety of the output voltage such as 10 W, 20 W and 40 W, its applicability improves and hence tremendous cost reduction can be expected.

For the battery 53 of this embodiment, primary battery including alkaline battery and manganese battery, rechargeable battery including lead battery, nickel hydride battery and lithium battery, or other types batteries including fuel cell and solar cell is applicable.

Available shape of the connector 9, which may differ by the type of connection with the load 15, can be a cable-like flexible piece, a solid piece such as a connection plug, and so on.

Figure 2:
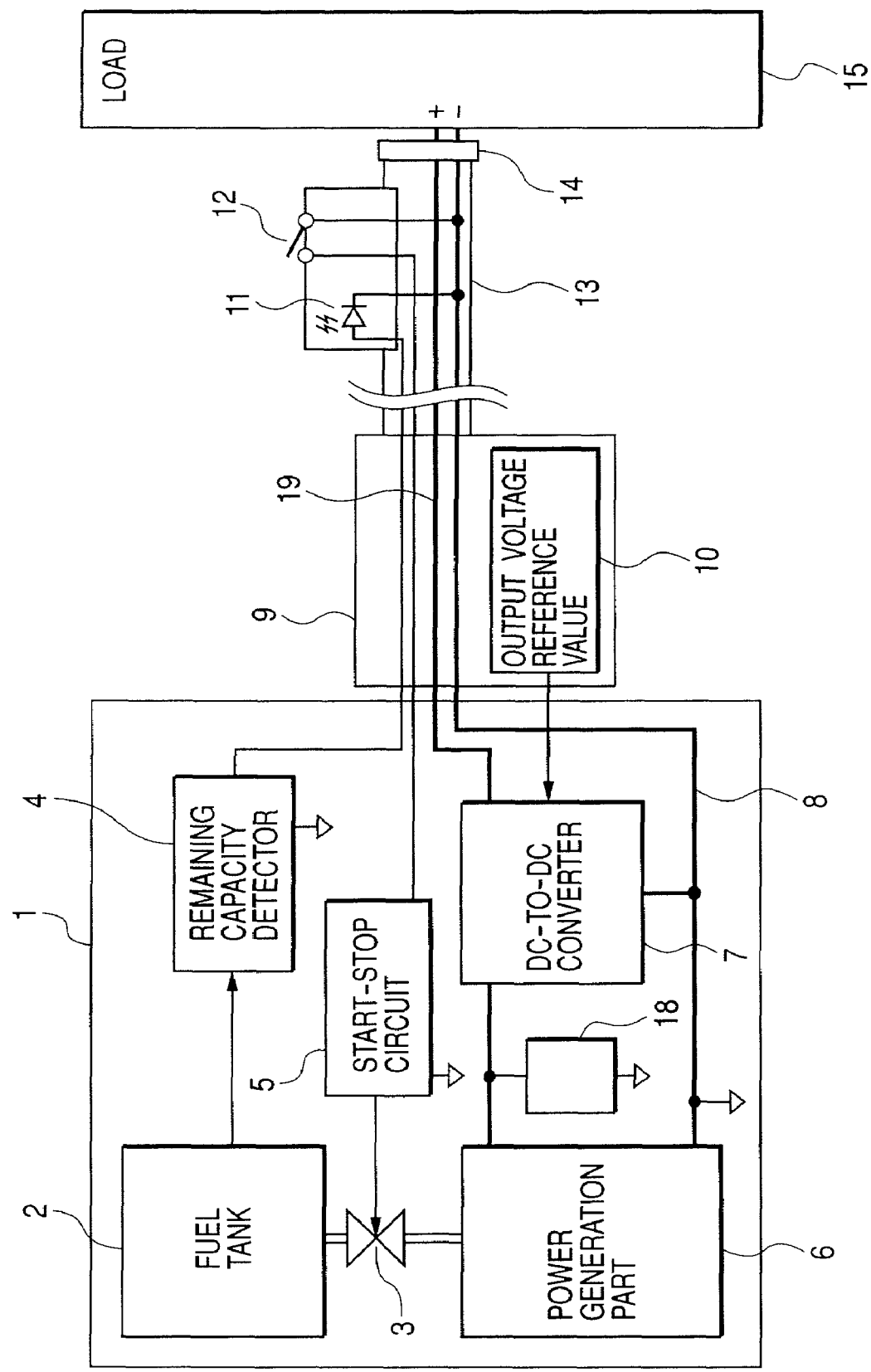
FIG. 2 is a block diagram of a mobile type power supply according to the second embodiment of the invention.
Figure 3:
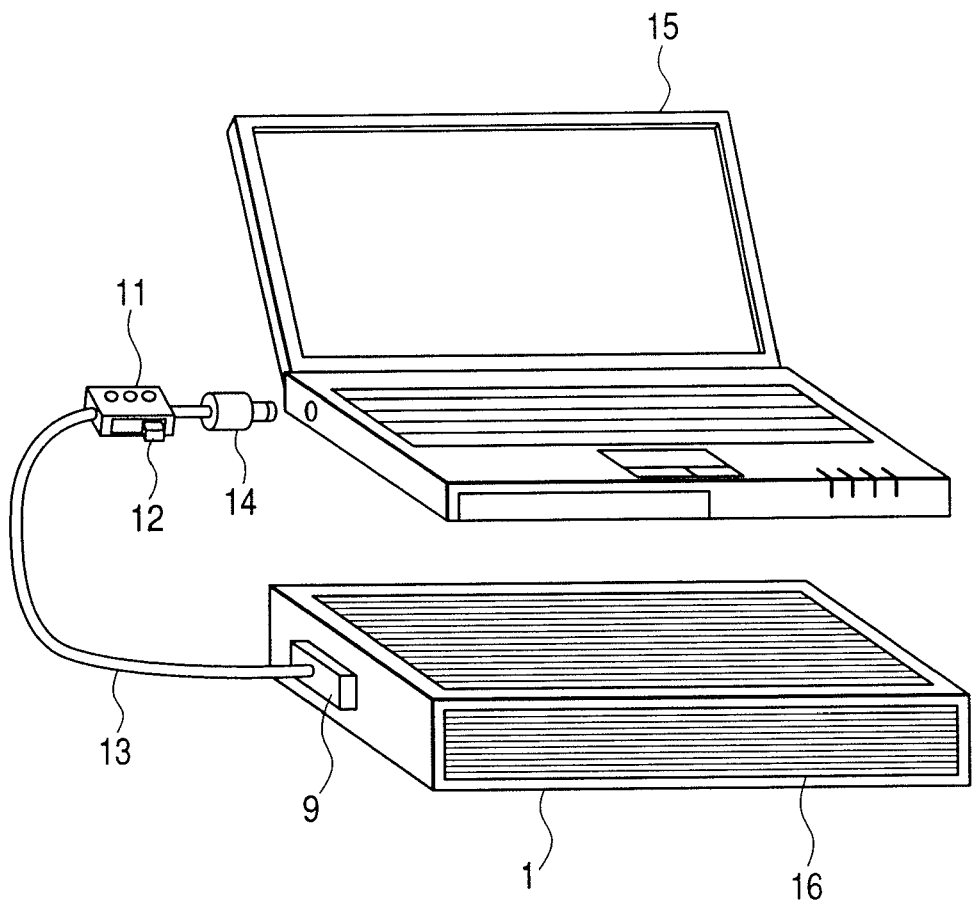
FIG. 3 shows an oblique view of the mobile type power supply in the second embodiment.

The second embodiment of the invention is described hereunder, using FIG. 2 and FIG. 3. A fuel cell pack 1 contains a fuel tank 2, valve 3, power generation part 6, start-stop circuit 5, remaining capacity detector 4, DC-to-DC converter 7, and control power supply 18, and the fuel cell pack 1 is connected to a load 15 via a connector 9, cable 13 and DC plug 14. The connector 9, cable 13 and DC plug 14 are provided as the connection means; where one end of the connector 9 is connected to the fuel cell pack 1 and the DC plug 14 on the end of the cable 13 is connected to the load 15. The connector 9 contains an output voltage reference value output means 10 and a light emitting diode 11 and switch 12 are provided as a remaining capacity display means at a position near the load 15 on the cable 13. The light emitting diode 11 is connected to the remaining capacity detector 4 by the cable 13 and the switch 12 is connected to the start-stop circuit 5 by the cable 13.

The fuel tank 2 is provided as the fuel storage means that stores fuel for the fuel cell, and the valve 3 is provided as the control valve that opens/closes the fuel passage between the fuel tank 2 and the power generation part 6. The start-stop circuit 5 is provided as an element of the connection condition detection means that detects the condition of the connection between the fuel cell pack 1 and the connector 9. The remaining capacity detector 4 is provided as the remaining capacity detection means that receives signals from multiple sensors, installed vertically in the fuel tank 2, and detects the remaining capacity in the fuel tank 2 based on the signals from each sensor. The detector is designed to send a signal, corresponding to the remaining capacity in the fuel tank 2, to the light emitting diode 11. Multiple vent holes 16 are made around the fuel cell pack 1.

The operation of this embodiment is described hereunder. The fuel cell pack 1 is a direct methanol type fuel cell (DMFC) but it can be any other type of fuel cell provided the shape and size fit for mobile application. The output power depends upon the equipment connected as a load, and approximately 20 to 40 W is required for a mobile type personal computer.

The connector 9 on the end of the cable 13 is connected to the fuel cell pack 1 and a DC plug 14 is connected to a DC-IN terminal of the load 15 so as to connect the fuel cell pack 1 to the load 15 via the connector 9, cable 13 and DC plug 14. Thus, when the switch 12 is turned on, the start-stop circuit 5 sets the valve 3 open and the fuel is supplied from the fuel tank 2 to the power generation part 6. The power generation part 6 then begins to generate power and the voltage generated by the fuel cell is applied to the DC-to-DC converter 7. In this operation, because the output voltage reference value output means 10, located inside the connector 9, is connected to the DC-to-DC converter 7, the output voltage of the DC-to-DC converter is controlled according to the output voltage reference value. Consequently, a voltage set in the output voltage reference value output means 10 is outputted to the output voltage line 19, and this voltage is supplied to the load 15. During the operation, the remaining capacity of the fuel in the fuel tank 2 is detected by the remaining capacity detector 4, and the emission pattern of the light emitting diode 11 changes according to the detection result. For example, in the case of using three light emitting diodes 11, the number of diodes that emit light changes according to the remaining capacity of the fuel in the fuel tank 2. In the case of using a single light emitting diode 11, it is possible to display the remaining capacity by changing the color of the light, for example, from green to red, or by either emitting or flickering the light depending upon the remaining capacity.

When the switch 12 is turned off, a closed circuit of the start-stop circuit 5→switch 12→ground line 8→start-stop circuit 5 is opened, the start-stop circuit 5 recognizes the operation is on a halt and so the valve 3 is set closed. Thus, the fuel supply from the fuel tank 2 to the power generation part 6 is stopped and power generation is stopped.

When the connector of the cable 13 is disconnected from the fuel cell pack 1, the closed circuit of the start-stop circuit 5→switch 12→ground line 8→start-stop circuit 5 is opened like the above, and so power generation is stopped.

With this embodiment, as described above, by employing a power generation stop function that is actuated by the switch 12 operation or cable 13 disconnection, fuel consumption of the power supply while not in use can be eliminated and hence the fuel consumption rate be improved.

Providing the switch 12 close to the load 15 can improve the user's operability of the power supply. Besides, by interlocking one of the three light emitting diodes with the switch 12, power generation/halt mode can be easily displayed. This further improves the visibility.

According to this embodiment, even if the fuel cell pack 1 is located apart from a notebook type personal computer, which constitutes the load 15, the remaining capacity of the fuel in the fuel tank 2 can be easily displayed and the power generation can be turned on/off easily. With this construction, the fuel cell pack 1 can be so designed as to be able to generate power most efficiently, for example, by providing the vent holes 16 all round so as to increase the surface area. Consequently, the volume of the fuel cell pack 1 can be minimized.

Applicable equipments to the load 15 are not limited to the information equipments such as notebook type personal computers and terminal devices, but can be a wide variety of equipments, including those for mobile use and those of carried type for outdoor use.

Figure 4:
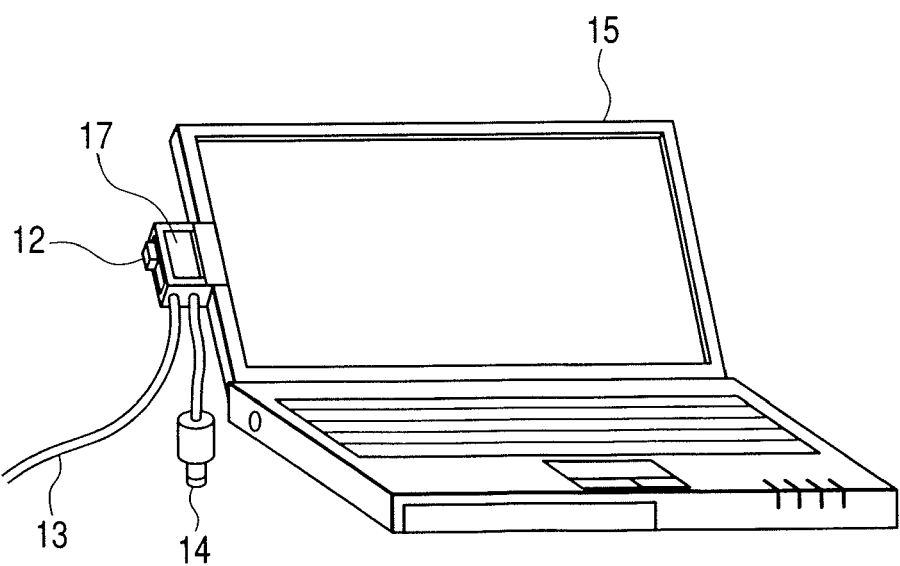
FIG. 4 is a figure showing the construction of the connection cable of a mobile type power supply according to the third embodiment of the invention.

Next, the third embodiment of the invention is described hereunder, using FIG. 4. This embodiment is a modification to the cable 13 described in the second embodiment, and so the construction is the same as in the second embodiment except for the components shown in the figure. In FIG. 4, the load 15 is a notebook type personal computer and a DC-IN plug is provided on the rear of the computer. The cable 13 is provided with a liquid crystal display 17 as the remaining capacity display means and a switch 12 is provided adjacent to the liquid crystal display 17. The liquid crystal display 17 is so designed to be able to be clipped on the side edge of the liquid crystal display screen of the computer. The power generation/halt mode and remaining capacity of the fuel cell pack 1 are displayed on the liquid crystal display 17.

With the above construction, even in the case of a notebook type personal computer, which constitutes the load 15, equipped with a DC-IN plug on its rear, the fuel cell pack 1 is easily applicable. Thus, the user's visibility improves and an environment with high operability of the equipment can be offered.

Figure 5:
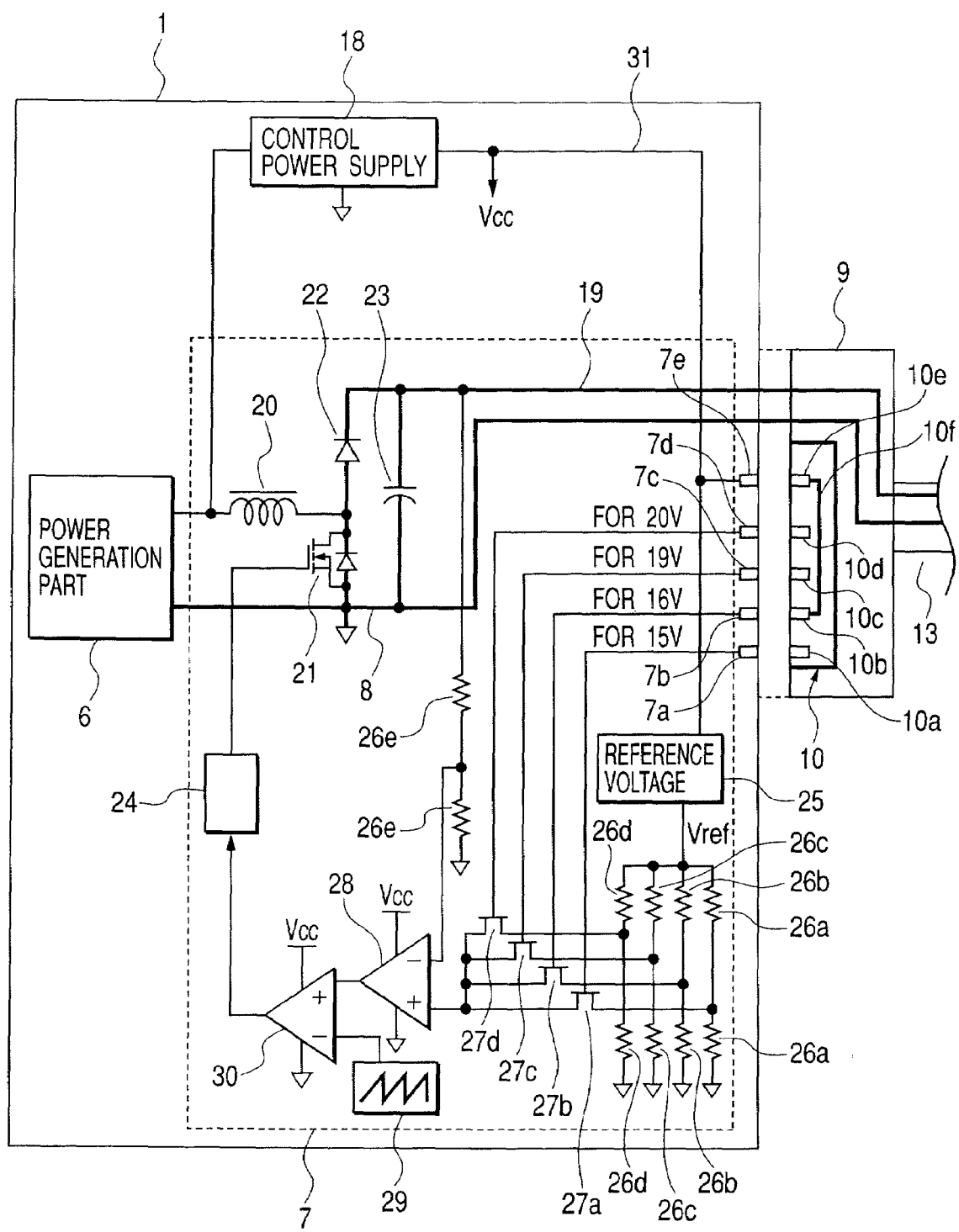
FIG. 5 is a circuit diagram of the DC-to-DC converter of a mobile type power supply according to the fourth embodiment of the invention.

Next, the fourth embodiment of the invention is described hereunder, using FIG. 5. FIG. 5 is a block diagram showing a concrete construction of a DC-to-DC boost converter 7 of a mobile type power supply, which constitutes the circuit for determining the output voltage of the fuel cell pack 1. In FIG. 5, there are provided a power generation part 6, DC-to-DC converter 7 and control power supply 18 inside the fuel cell pack 1, and they are connected to each other. The control power supply 18 receives the output voltage of the power generation part 6 and outputs the voltage as Vcc 31 to a reference voltage circuit 25. The DC-to-DC converter comprises a coil 20, diode 22, power MOSFET 21, smoothing capacitor 23, drive circuit 24, reference voltage circuit 25, multiple dividing resistors 26, multiple FETs 27, error amplifier 28, triangular wave oscillator 29, and PWM comparator 30. The coil 20 connected to the power generation part 6 is connected to the connection point between the anode of the diode 22 and drain of the MOSFET 21, and the cathode of the diode 22, along with the high potential side of the smoothing capacitor 23, is connected to an output power line 19. The low potential side of the smoothing capacitor 23, along with the source of the power MOSFET 21, is connected to the power generation part 6 and also to a ground line 8. These constitute a boost converter circuit. The output voltage line 19 and ground line 8 are connected to a load 15 (not shown) via a connector 9 and cable 13. The connection with the load is the same as in FIG. 2. The output of the reference voltage circuit 25 is applied as Vref to a number of paired dividing resistors 26a to 26d. In FIG. 5, there are provided four pairs of the dividing resistors 26a to 26d and each pair of the dividing resistors 26a to 26d have different dividing ratio to generate a reference voltage corresponding to 20V, 19V, 16V and 15V. FETs 27a to 27d are connected to the connection point between each of the paired dividing resistors 26a to 26d. Each gate of the FETs 27a to 27d is connected to the connection terminal 7a to 7d, respectively. Each connection terminal 7a to 7d is so designed to be able to be connected to the pin insertion terminals 10a to 10d inside the connector 9, respectively.

In the connector 9, there are provided a pin insertion terminal 10e in addition to the pin insertion terminals 10a to 10d. The pin insertion terminal 10e is so designed to be able to be connected to a connection terminal 7e inside the fuel cell pack 1, and the connection terminal 7e is connected to Vcc 31. Of the multiple pin insertion terminals 10a to 10e, a pin 10f for 16V, conductive pin for shorting two pin insertion terminals, are inserted between the pin insertion terminals 10b and 10e. The multiple pin insertion terminals 10a to 10e and the pin 10f constitute the output voltage reference value output means 10, which is so designed that, by inserting the pin 10f for 16V between the pin insertion terminals 10b and 10e, an output voltage reference value of 16V is set for the DC-to-DC converter 7. A pin 10f for 15V, 19V and 20V is also available. The pin for 15V is so designed to be inserted between the pin insertion terminals 10a and 10e; the pin for 19V is so designed to be inserted between the pin insertion terminals 10c and 10e; and the pin for 20V is so designed to be inserted between the pin insertion terminals 10d and 10e. When any one of the above pins is inserted between the specified pin insertion terminals, an output voltage reference value of 15V, 19V or 20V is set for the DC-to-DC converter 7.

The output of each FET 27a to 27d is inputted altogether to the non-reversed input terminal of the error amplifier 28. A voltage, which is the voltage of the output voltage line 19 divided by the paired dividing resistors 26e, is inputted to the reversed input terminal of the error amplifier 28. The output of the error amplifier 28 is inputted to the non-reversed input terminal of the PWM comparator 30. On the other hand, the output of the triangular wave oscillator 29 is inputted to the reversed input terminal of the PWM comparator 30. The output of the PWM comparator 30 is inputted to the gate of the power MOSFET 21 via the drive circuit 24.

Next, the operation of the DC-to-DC converter 7 is described hereunder. When the connector 9 is connected to the fuel cell pack 1, Vcc 31 is electrically connected to the output voltage reference value output means 10 via the pin. In the output voltage reference value output means 10, Vcc is connected to the pin according to the output voltage specification of the cable 13, that is, the power supply voltage specification of the load. The output voltage specification of the cable 13 shown in the figure is 16V and accordingly, of the FETs 27a to 27d inside the DC-to-DC converter 7, only FET 27b that corresponds to 16V is set on. As a result of this, a voltage of 16V is applied to the error amplifier 28 as the reference voltage. Then, the error amplifier 28 performs a feedback control so that the voltage of the output voltage line 19 turns to 16V.

The output of the fuel cell outputted from the power generation part 6 is boosted to stable 16V by the boost converter, and then supplied to the load via the cable 13.

According to this embodiment, by an operation as simple as inserting a cable 13 suitable for the load 5 into the fuel cell pack 1, a voltage suitable for the load is correctly selected and supplied, without any mistake, out of multiple output voltages the fuel cell can output. This enables the user to eliminate voltage setting mistake or wrong operation.

Figure 6:
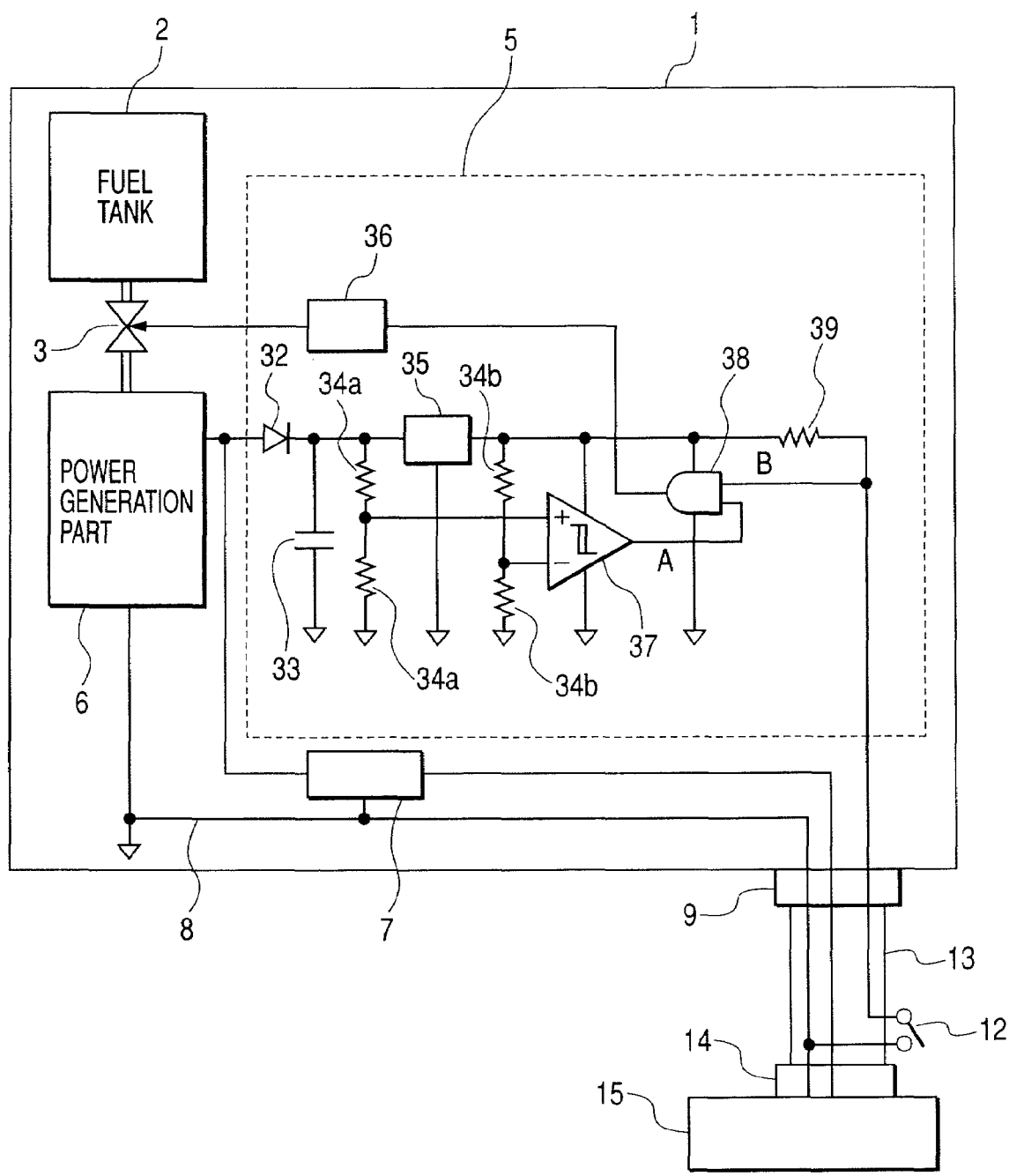
FIG. 6 is a circuit diagram of the start-stop circuit of a mobile type power supply according to the fifth embodiment of the invention.

Next, the fifth embodiment of the invention is described hereunder, using FIG. 6 and FIG. 7. FIG. 6 is a circuit diagram showing the start-stop circuit of a mobile type power supply. FIG. 7 is a chart explaining the relationship between the operation of the start-stop circuit 5 and the condition of the valve 3. In FIG. 6, the start-stop circuit 5 comprises a diode 32, electric double-layer capacitor 33, two pairs of dividing resistors 34a and 34b, control power supply 35, valve drive circuit 36, hysteresis comparator 37, AND circuit 38, and resistor 39, wherein the anode of the diode 32 is connected to the power generation part 6 and the cathode is connected to the electric double-layer capacitor 33. The dividing resistors 34a in series are connected in parallel to the electric double-layer capacitor 33. The control power supply 35 is connected to the electric double-layer capacitor 33, and the dividing resistors 34b in series, power supply terminal of the hysteresis comparator 37, power supply terminal of the AND circuit 38, and resistor 39 are connected to the output side of the control power supply 35. Besides, the connection point between each of the two paired dividing resistors 34a and 34b in series is connected to the hysteresis comparator 37. The output of the hysteresis comparator 37, which is output A, is inputted to the AND circuit 38. One end of the resistor 38, which is B, is inputted to the AND circuit 38 and also connected to the switch 12 via the connector 9 and cable 13. One end of the switch 12 is connected to the ground line 8. The output of the AND circuit 38 is inputted to the valve drive circuit 36, and the output of the valve drive circuit 36 is connected to the valve 3.

Next, the operation of the start-stop circuit 5 is described hereunder. The voltage of the fuel cell outputted from the power generation part 6 is transmitted to the DC-to-DC converter 7 and also applied to the electric double-layer capacitor 33 via the diode 32 to charge the capacitor 33. The electric double-layer capacitor 33 functions as the power source, and the voltage of the electric double-layer capacitor 33 is divided by the dividing resistor 34a and inputted to the hysteresis comparator 37.

On the other hand, the voltage of the electric double-layer capacitor 33 is stabilized by the control power supply 35 and the stabilized voltage is also divided by the dividing resistor 34b and inputted to the hysteresis comparator 37. In this operation, because of the voltage of the electric double-layer capacitor 33, the logic of the output A of the hysteresis comparator 37 becomes as shown in the column in FIG. 7. That is, when the voltage is lower than a specified value, A becomes L (low level) and, when the voltage is higher than a specified value, A becomes H (high level). On the other hand, depending upon the condition of the switch 12, B becomes as shown in the row in FIG. 7. That is, when the switch 12 is on, B is grounded and becomes L and, when the switch 12 is off, B is pulled up by the resistor 39 and becomes H. Beside, when the connector 9 and cable 13 are disconnected from the fuel cell pack 1, B becomes H because it is pulled up by the resistor 39.

Now, since the output of the AND circuit 38 becomes H only when the inputted A and B become H, if the valve drive circuit 36 is so operated as to close the valve 3 only when the output voltage of the AND circuit 38 is H, the condition of the valve 3 is determined by the voltage condition of the electric double-layer capacitor 33 and the condition of the switch 12 as shown in FIG. 7.

In other words, when the voltage of the electric double-layer capacitor 33 decreases, and if the switch 12 is on, the valve 3 is opened to supply the fuel from the fuel tank 2 to the power generation part 6. On the other hand, only when the voltage condition of the electric double-layer capacitor 33 is favorable and the switch 12 is off or the cable 13 is disconnected, the valve 3 is closed to stop power generation. The valve 3 shall favorably be of a type that requires power only upon a change in the condition, but can be a normally-on type that closes when voltage is applied.

While fuel consumption is reduced, energy saving is enhanced, and the fuel consumption rate is improved because of the above operation, electric remote control, including start and stop of the fuel cell pack 1, by means of the switch 12 becomes possible by employing the electric double-layer capacitor 33 as the control power supply (voltage source).

Although an electric double-layer capacitor 33 is employed in this embodiment, any other large-capacity capacitor or rechargeable battery, such as lithium ion battery and nickel hydride battery, can substitute.

Figure 8:
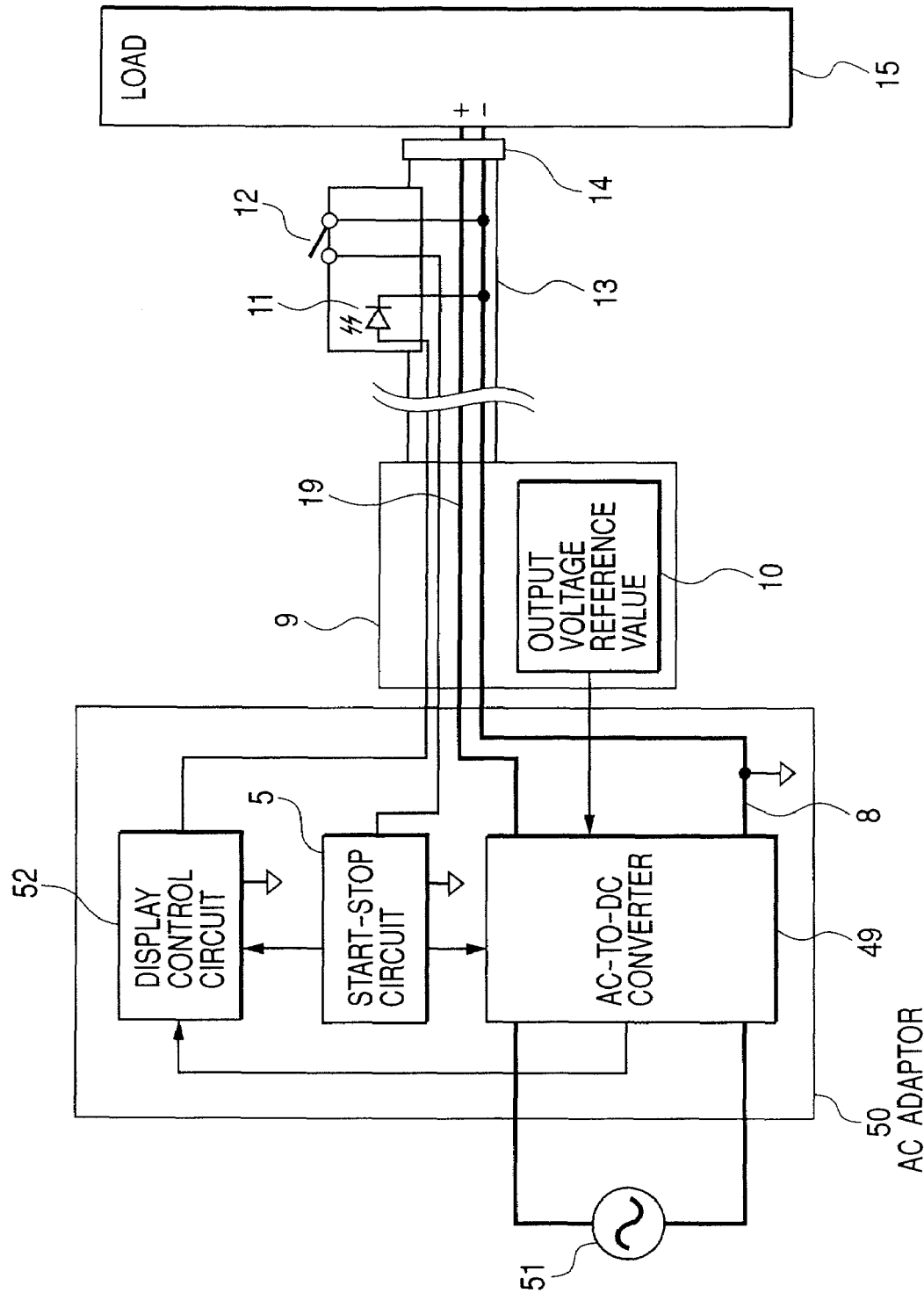
FIG. 8 is a block diagram of a mobile type power supply according to the sixth embodiment of the invention
Figure 9:
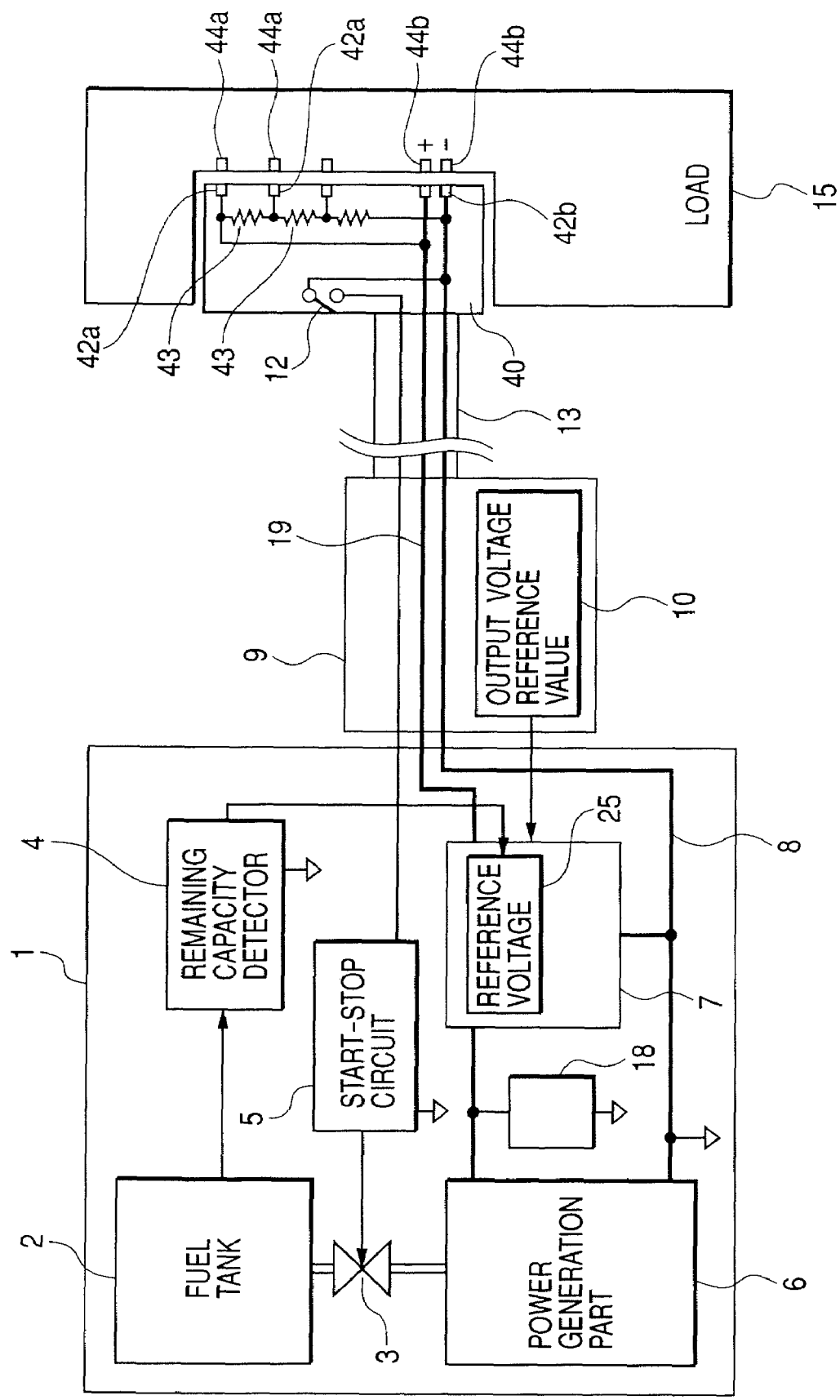
FIG. 9 is a block diagram of a mobile type power supply according to the seventh embodiment of the invention.
Figure 10:
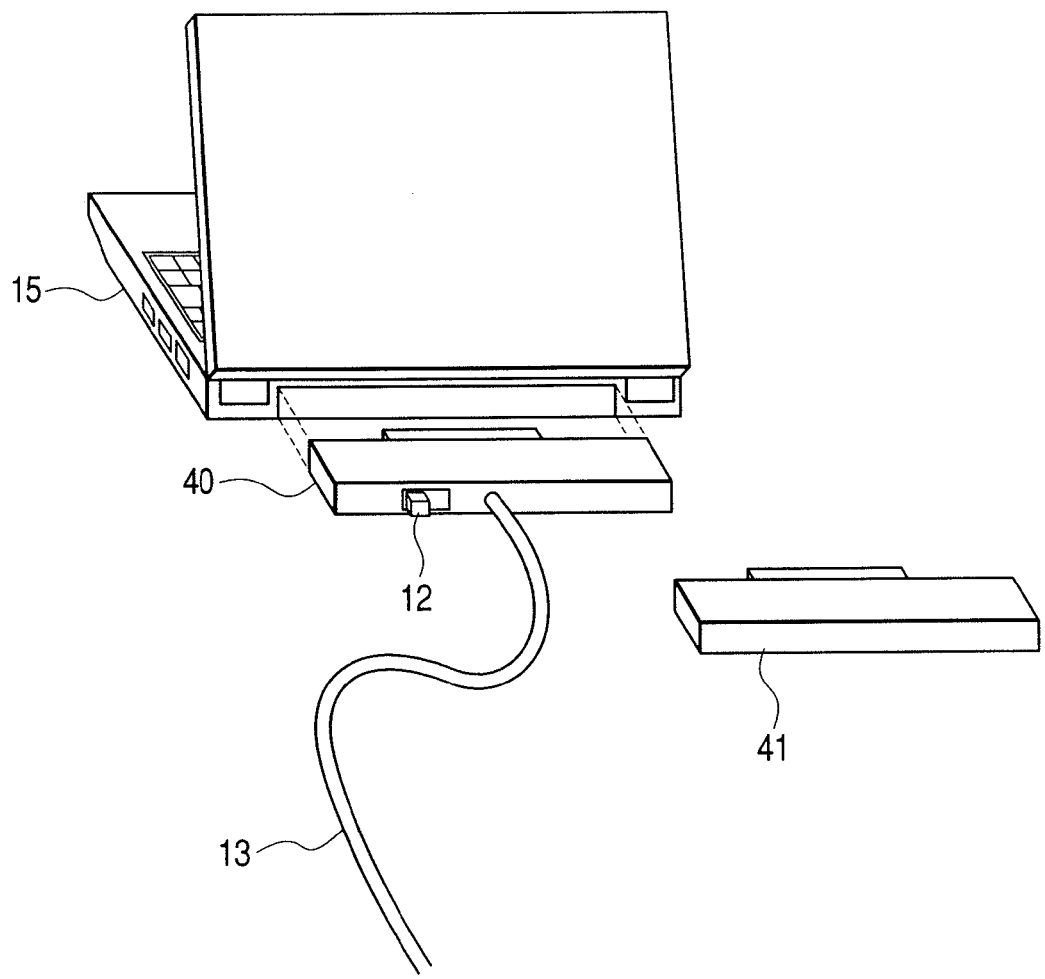
FIG. 10 shows an oblique view for explaining the relationship between the mobile type power supply and lithium ion battery pack according to the seventh embodiment of the invention.

Next, the sixth embodiment of the invention is described hereunder, using FIG. 8. This embodiment employs an AC adaptor 50 in place of the fuel cell pack 1 and uses a connector 9, cable 13 and DC plug 14 as the connection means. Other components are the same as shown in FIG. 2.

In FIG. 8, the AC adaptor 50 comprises an AC-to-DC converter 49, start-stop circuit 5, and display control circuit 52, and DC power is supplied to the AC-to-DC converter 49 from a commercial power source 51. When an output voltage reference value corresponding to the power supply voltage of the load 15 is inputted from the output voltage reference value output means 10 contained in the connector 9, the AC-to-DC converter 49 converts the DC power of the commercial power source 51 into DC power according to the output voltage reference value, and supplies the DC power to the load 15 via the output voltage line 19. The start-stop circuit 5 constitutes a conversion control means that controls the conversion by the AC-to-DC converter 49. In addition, the circuit has a function of a connection condition detection means that detects the connection condition between the connector 9 and AC adaptor 50, and stops the conversion of the AC-to-DC converter 49 when disconnection between the connector 9 and AC adaptor 50 is detected.

The display control circuit 52 constitutes an output condition detection means that detect the output condition of the AC-to-DC converter 49, and displays the output condition of the AC-to-DC converter on a light emitting diode 11. That is, the light emitting diode 11 constitutes an output condition display means that displays the output condition of the AC-to-DC converter 49.

Next, the operation is described hereunder. When the connector 9 is inserted into the AC adaptor 50, the output voltage reference value output means 10 contained in the connector 9 is connected to the AC-to-DC converter 49. Accordingly, the output voltage of the AC-to-DC converter 49 is determined. The start-stop circuit 5 operates in the same way as in the afore-mentioned embodiments, that is, it stops output when the switch 12 is off or the connector 9 is disconnected from the AC adaptor 50. The display control circuit 52 displays the condition of the AC-to-DC converter 49 on the light emitting diode 11. With this construction, it becomes possible for the user to monitor the voltage (100V, 200V, or else) of the commercial DC power source 51 and its condition, such as power failure and recovery, and the operating condition and output voltage of the AC-to-DC converter 49 on the light emitting diode 11. Besides, since the cable 13 can be of the same specification as for the one to be connected to the fuel cell pack 1 described in the afore-mentioned embodiments, it becomes also possible for the user to use the AC adaptor 50 when a commercial DC power source 51 is available and, where no commercial DC power source 51 is available, to prepare and use the fuel cell pack 1 instead.

According to this embodiment, as described above, a mobile type power supply that is applicable to various environments of using equipments and very much easy to use for users can be offered.

Next, the seventh embodiment of the invention is described hereunder, using FIGS. 9, 10, 11, and 12. In this embodiment, the output of the remaining capacity detector 4 inside the fuel cell pack 1 is connected to the reference voltage circuit 25 inside the DC-to-DC converter 7, and a lithium battery compatible plug 40 is provided, instead of the DC plug 14, on the end of the cable 13. Other components are the same as shown in FIG. 2. The remaining capacity detector 4 alters the output voltage of the reference voltage circuit 25 inside the fuel cell pack 1 forcibly according to the remaining capacity of the fuel in the fuel tank 2, and forcibly alters (decreases) the output voltage reference value for the DC-to-DC converter 7 according to the remaining capacity in the fuel tank 2. Besides, the lithium battery compatible plug 40 has the same shape as the lithium ion battery pack 41 shown in FIG. 10, and is exchangeable with the lithium ion battery pack 41. The lithium battery compatible plug 40 contains a switch 12 for tuning on/off the fuel cell and also contains multiple (three) resistors 43 and multiple (three) terminals 42a. Each terminal 42a is connected to each lithium battery condition detection terminal 44a, respectively, and the paired power supply terminals 42b of the lithium battery compatible plug 40 are provided for connection to the paired lithium battery power supply terminals 44b on the load side. Of the multiple terminals 42a, the terminal 42a connected to the output voltage line 19 and ground line 8 constitutes a power supply voltage detection means that detects the output voltage of the DC-to-DC converter 7 as the power supply voltage of the load 15. Each resistor 43 divides the output voltage of the DC-to-DC converter 7 and outputs the divided voltage from the terminal 42a to the load 15 via the lithium battery condition detection terminal 44a.

Next, the operation is described hereunder. The output voltage of the fuel cell pack 1 is supplied from the lithium batter power supply terminal 44b to the load 15 through the output voltage line 19 and ground line 8 and via the connector 9, cable 13 and lithium battery compatible plug 40.

Figure 11:
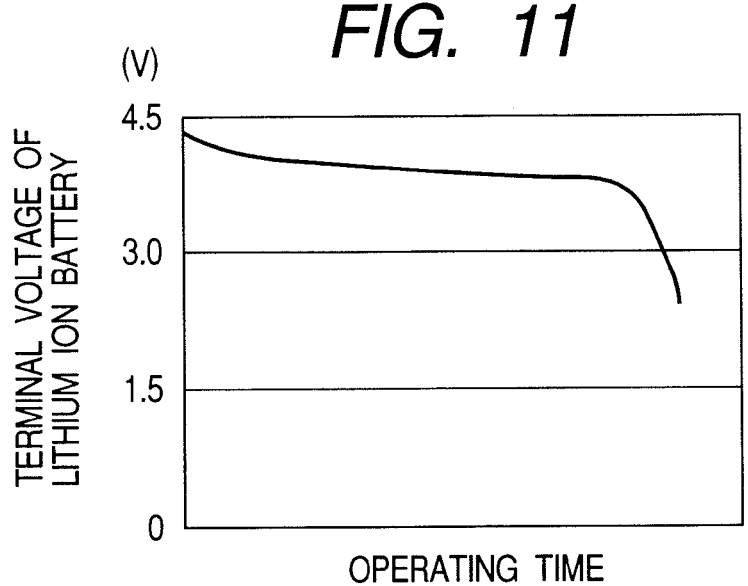
FIG. 11 shows a characteristic curve showing the relationship between the lithium ion battery terminal voltage and operating time.
Figure 12:
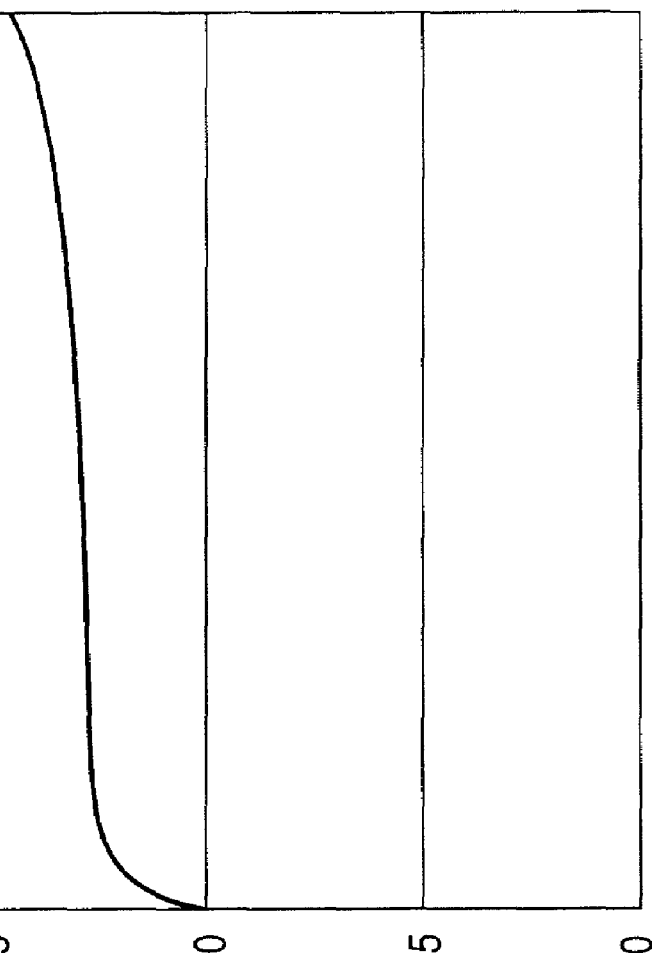
FIG. 12 shows a characteristic curve showing the relationship between the remaining capacity of the fuel tank and the output voltage of the DC-to-DC converter in the seventh embodiment of the invention.

The terminal voltage of the lithium ion battery varies as shown in FIG. 11 because the capacity (SOC) of the battery decreases as the time elapses. In this embodiment, therefore, the reference voltage of the DC-to-DC converter 7 (that is, the output voltage of the reference voltage circuit 25) is varied to the characteristic shown in FIG. 12 according to the remaining capacity of the fuel in the fuel tank 2 of the fuel cell pack 1. In doing this, the characteristic in FIG. 12 shall correspond to the number of lithium ion cells in series and the remaining capacity. It is naturally necessary that the output voltage reference value of the output voltage reference value output means 10 must consider the number of cells in series in the lithium ion battery pack 41 suitable for the load 15. This construction makes the load 15 recognize as if a lithium ion battery is installed. Because of this, when the remaining capacity of the fuel tank 2 decreases, the remaining capacity detection function of the lithium battery installed on the notebook type personal computer is actuated, and so the user, taking the battery remaining capacity displayed on the computer as the display of the fuel capacity of the fuel cell, can be aware of fuel shortage well in advance.

With this embodiment, a system with excellent operability can be offered because the user can use the fuel cell pack 1 without any modification to the remaining capacity detection and display mechanism with which the user has been familiar.

Figure 13:
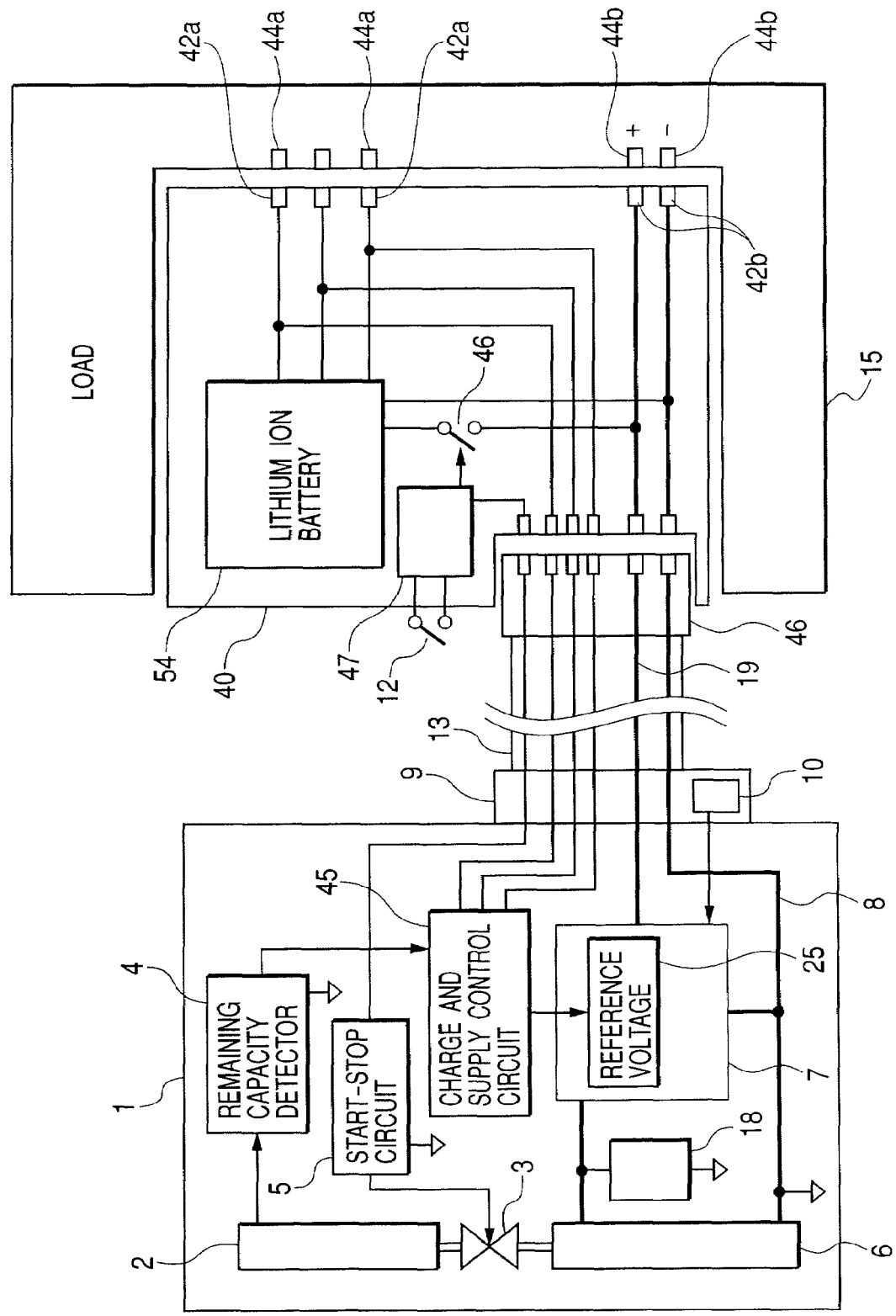
FIG. 13 is a block diagram of a mobile type power supply according to the eighth embodiment of the invention.

Next, the eighth embodiment of the invention is described hereunder, using FIG. 13 and FIG. 4. In this embodiment, a charge and supply control circuit 45 is provided in the fuel cell pack 1, the output of the remaining capacity detector 4 is connected to the reference voltage circuit 25 of the DC-to-DC converter 7 via the charge and supply control circuit 45, a connector 46 is provided on the end of the cable 13, the connector 46 is connected to the lithium battery compatible plug 40, and a lithium ion battery 54 is contained in the lithium battery compatible plug 40; and besides a switching circuit 47 is provided on the switch 12, the lithium ion battery 54 is connected three lithium battery condition detection terminals 44a and also to the paired lithium battery power supply terminals 44b, and a switch 48 is provided between the output voltage line 19 and lithium ion battery 54. Other components are the same as in FIG. 9.

Figures 14, 15:
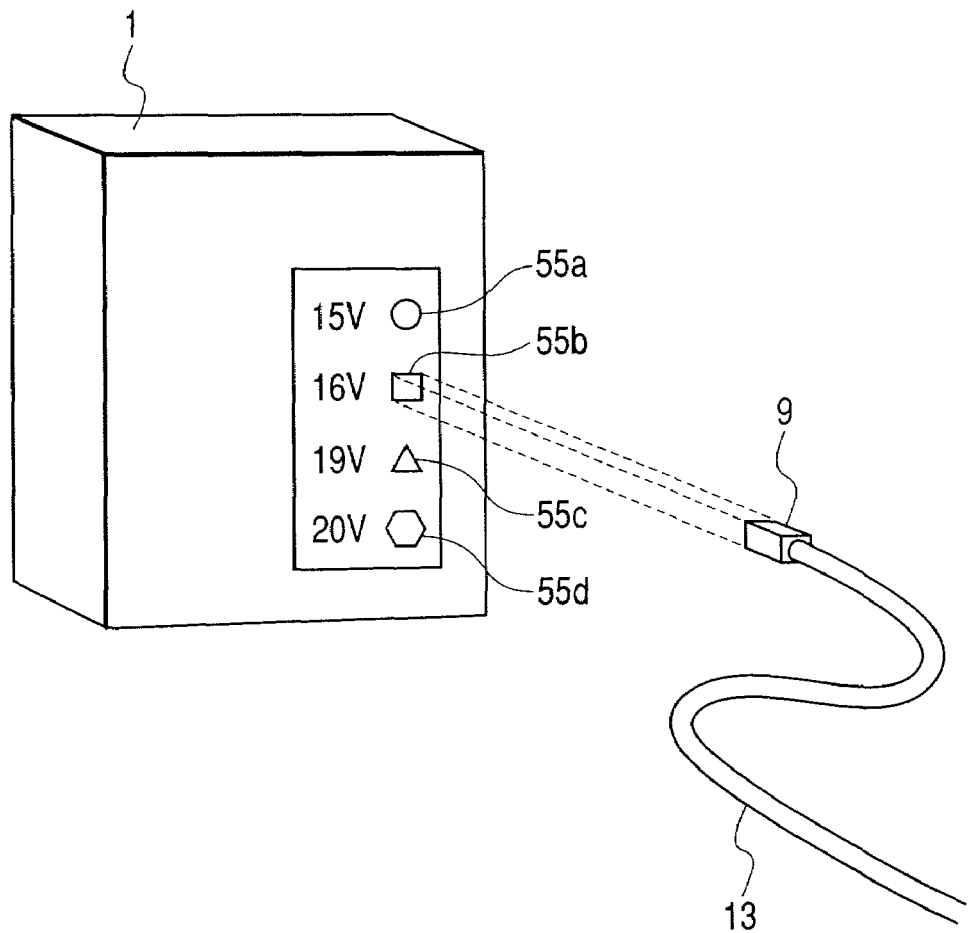
FIG. 14 is a figure for explaining the operation of the switching circuit of the mobile type power supply in the eighth embodiment of the invention.
FIG. 15 is a figure for explaining the terminal shape of a mobile type power supply according to the ninth embodiment of the invention.

That is, this embodiment is characteristic in that the lithium ion battery 54 is provided in the lithium battery compatible plug and so the lithium ion battery pack 1 has a function of charging the lithium ion battery 54. Conditions of the switch 12, connector 46, switch 48 and valve 3 are as shown in FIG. 14. The switch circuit 47 changes over each condition.

Next, the concrete operation of the embodiment is described hereunder. First, when the switch 12 is on and the connector 46 is connected properly, the switch 48 is set on and the lithium ion battery 54 is connected to the output voltage line 19 of the fuel cell pack 1. When this is caused, the valve 3 is open and the fuel cell is in the power generation mode. The lithium ion battery 54 is then set to a charge mode. In this mode, each cell voltage of the lithium ion battery 54 is inputted to the charge and supply control circuit 45, and the charge and supply circuit 45 controls the reference voltage circuit 25 of the DC-to-DC converter 7 so as to properly charge the lithium ion battery 54. Besides, it supplies power also to the load 15 via the lithium battery power supply terminal 44b.

When the switch 12 is on and the connector 46 is disconnected, the switch 48 is set on in the switching circuit 47 but the valve 3 is closed by the start-stop circuit 5, and so power generation of the fuel cell is stopped. When this is caused, power is supplied from the lithium ion battery 54 to the load 15. If an AC adaptor is additionally connected to the load 15, it is also possible to charge the lithium ion battery 40 from the load 15 side. When this applies, the condition of the lithium battery 54 is sent to the load 15 by the lithium battery condition detection terminal 42 for proper charging. This embodiment is very much reliable because the supply source switches automatically to the lithium battery 54 as above if the connector 46 is unexpectedly disconnected. Even in the case that the connector 9 is disconnected from the fuel cell pack 1, the equipment is similarly protected from a failure due to connector disconnection because the supply source switches from the lithium battery 54 to the power generation for the load 15.

When the switch 12 is turned off, the valve 3 is always closed when the switch 48 is turned on, irrespective of the connection of the connector 46. With this construction, waste of fuel in the fuel cell pack 1 can be prevented. Besides, when the connector 46 is disconnected, the switch 12 in no way acts upon the lithium ion battery 54, and so the lithium ion battery pack can be used as an ordinary one.

Since switching from an ordinary lithium ion battery pack to the fuel cell pack, and vice versa, can be done easily according to this embodiment, the power supply can meet user's requirement for wide applications.

In addition, since fuel cell is slower in response to a momentary load variation than lithium ion battery, utilization of the above construction, that is, use of the lithium ion battery 54 as an auxiliary power supply, enables to build a power supply system that can hardly be affected by a momentary load variation.

Figure 16:
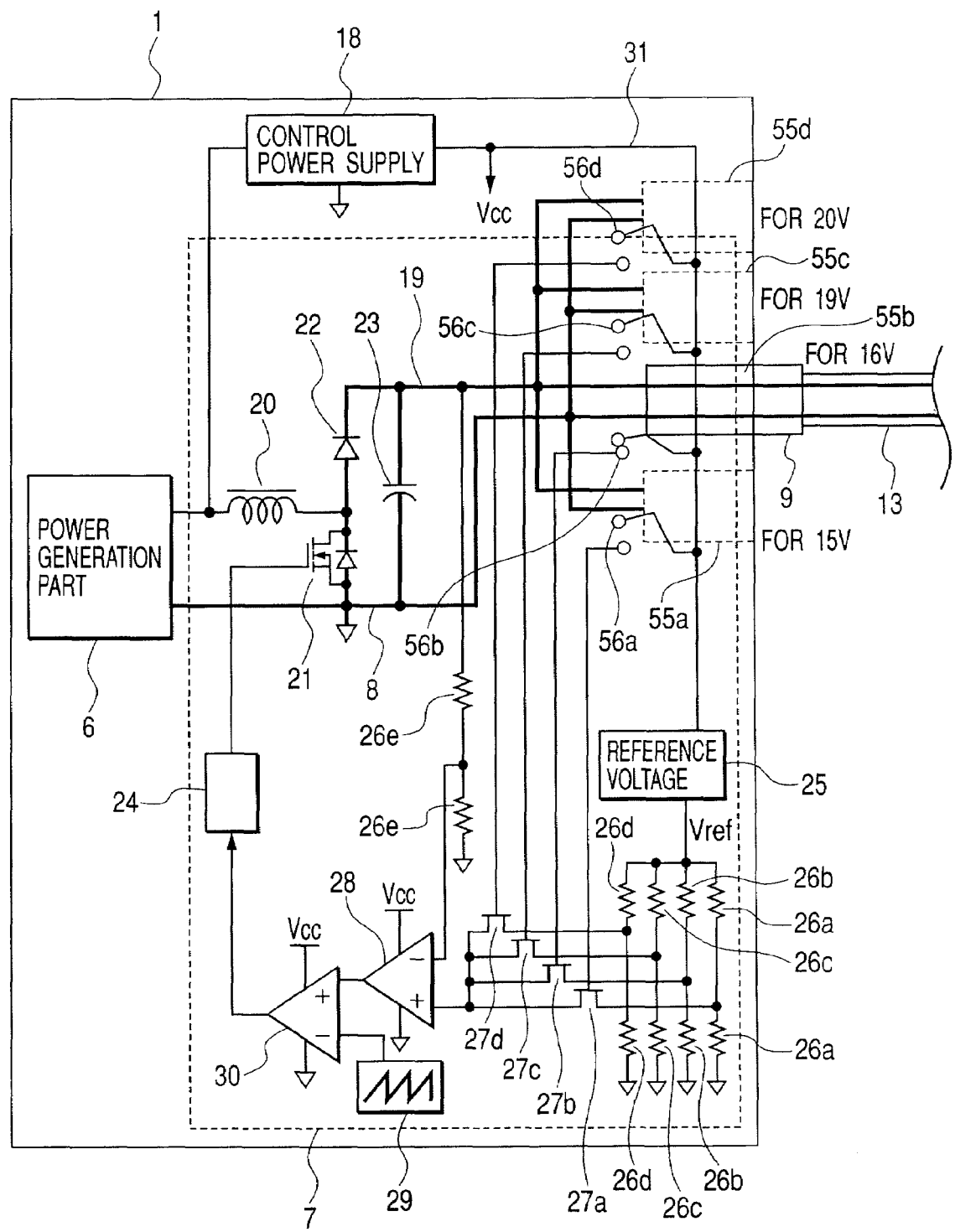
FIG. 16 is a block diagram of a mobile type power supply in the ninth embodiment of the invention.

Next, the ninth embodiment of the invention is described hereunder, using FIG. 15 and FIG. 16. In this embodiment, on the fuel cell pack 1, the shape of the connection with the connector 1 is modified according to the power supply voltage of the load or the output voltage specification of the cable 13, and there are provided connector insertion port 55a to 55d for each 15V, 16V, 19V and 20V at the connection. The connector insertion port 55a for 15V fits with the connector 9 having a round shape; the connector insertion port 55b for 16V fits with the connector 9 having a rectangular shape; the connector insertion port 55c for 19V fits with the connector 9 having a triangular shape; and the connector insertion port 55d for 20V fits with the connector 9 having a hexagonal shape.

The fuel cell pack 1 of this embodiment is equipped with multiple connector insertion ports 55a to 55d in accordance with the power supply voltage of the load or the output voltage specification of the cable 13 as above, and each connector insertion port 55a to 55d has a different shape. If, for example, the connector 9 for 16V is used for the cable 13, the connector 9 is connected only to the connector insertion port 55b, and so the output voltage reference value for the DC-to-DC converter 7 is always set to 16V.

That is to say, when the connector 9 of the cable 13 is inserted into the connector insertion port 55b of the fuel cell pack 1, the terminals 56b for 16V are connected with each other among the multiple terminals 56a to 56d, as shown in FIG. 16, and the FET 27b for 16V is set on and accordingly an output voltage of 16V is outputted from the DC-to-DC converter 7.

It must be noted that any protection circuit for a case where two or more connectors 9 are inserted at the same time is not shown in this embodiment. By providing a protection circuit that prohibits outputting any voltage in the above case, the equipment connected as load can be protected from a failure resulting from improper operation.

According to each of the above-mentioned embodiments, there is produced a merit that a new type of energy can be offered without any modification to the load. That is, any load already existing in the market, office and home can be driven by the fuel cell. Besides, if battery pack is sold together with multiple connectors suitable for different loads, only a single type of battery pack becomes applicable to various loads. Since the required lineup of the battery pack 53 can be as small as the variety of the output voltage such as 10 W, 20 W and 40 W, its applicability improves and hence tremendous cost reduction can be expected.

In addition, by providing a means for displaying the remaining capacity of the fuel cell, for example, on the cable, the user's operability and visibility improve.

Further, the connector 9 and cable 13, used as the connection means in each embodiment, can be constructed into a connection device. And further, the mobile type power supply in each embodiment and an electronic equipment connected as load can together be constructed into a mobile type electronic equipment.

EFFECTS OF THE INVENTION

As explained above, according to the prevent invention, the battery pack cost can be reduced as a result of common utilization.

What is claimed is:

1. A mobile type power supply, comprising a battery pack and a connection means:
   wherein the battery pack contains:
   a fuel cell battery;
   an output voltage conversion means that converts the output voltage of the fuel cell battery according to an output voltage reference value;
   a fuel storage means for storing the fuel for the fuel cell; and
   a remaining capacity detection means that detects the remaining capacity of the fuel storage means;
   wherein the connection means comprises:
   a power output line for connecting the battery pack and a load and supplies DC power outputted by the by the output voltage conversion means to the load;
   power supply output terminals for connecting the power output line to power supply input terminals of the load;
   an output voltage reference value output means that outputs an output voltage reference value, corresponding to the power supply voltage of the load, to the output voltage conversion means;
   a power supply voltage detection means that detects the output voltage of the output voltage conversion means as the power supply voltage of the load;
   voltage detection terminals for outputting output of the power supply voltage detection means to a rechargeable batter condition detection terminals of the load; and
   a battery compatible plug comprising the power supply output terminals connectable to the power supply input terminals of the load, and the voltage detection terminals connectable to the rechargeable battery condition detection terminals of the load;
   wherein the battery compatible plug has the same shape as the rechargeable battery pack, and is exchangeable with the rechargeable battery pack; and
   wherein the remaining capacity detection means alters the output voltage reference value for the output voltage conversion means forcibly according to the remaining capacity of the fuel storage means.

2. A mobile type power supply according to claim 1, further comprising a remaining capacity display means installed on the connection means for displaying the remaining capacity of the fuel storage means according to the detection output from the remaining capacity detection means.

3. A mobile type power supply according to claim 1, wherein:
   the rechargeable battery compatible plug is provided with a switch that constitutes an element of the connection condition detection means and turns on/off the fuel cell.

4. A mobile type power supply according to claim 1, wherein the output voltage conversion means is a DC-to-DC boost converter.

5. A mobile type power supply according to claim 1, further comprising:

a power generation control means that controls the fuel cell battery, and a connection condition detection means for detecting the connection condition between the connection means and battery pack;

the power generation control means stopping power generation when disconnection between the connection means and battery pack is detected by the connection condition detection means.

6. A mobile type power supply according to claim 5, wherein:

the power generation control means comprises a valve that opens/closes the fuel passage connecting the fuel storage means that stores the fuel for the fuel cell and a power generation part that receives the fuel and generates power; and the valve closes the fuel passage at the time when disconnection between the connection means and battery pack is detected by the connection condition detection means and also on condition that the voltage of a charge accumulation means that accumulates electric charge outputted by the power generation part is higher than a specified value.

7. A mobile type power supply according to claim 5, further comprising a switch installed in the connection means, the switch constituting an element of the connection condition detection means and turns on/off the fuel cell.

8. A mobile type power supply according to claim 5, further comprising a switch installed in the connection means, the switch constituting an element of the connection condition detection means and turns on/off the fuel cell;

wherein the power generation control means comprises a valve that opens/closes the fuel passage connecting the fuel storage means that stores the fuel for the fuel cell and a power generation part that receives the fuel and generates power; and wherein the valve closes the fuel passage at the time when the switch is turned off and also on condition that the voltage of a charge accumulation means that accumulates electric charge outputted by the power generation part is higher than a specified value.

* * * * *